United States Patent [19]

Pischinger et al.

[11] Patent Number: 4,897,096
[45] Date of Patent: Jan. 30, 1990

[54] SYSTEM FOR THE REGENERATION OF A PARTICULATE FILTER TRAP

[75] Inventors: Franz Pischinger, Aachen; Gerhard Lepperhoff, Eschweiler, both of Fed. Rep. of Germany

[73] Assignee: FEV Motorentechnik GmbH & Co. KG., Aachen, Fed. Rep. of Germany

[21] Appl. No.: 215,546

[22] Filed: Jul. 5, 1988

Related U.S. Application Data

[63] Continuation-in-part of Ser. No. 25,738, Mar. 13, 1987, abandoned.

[30] Foreign Application Priority Data

Mar. 15, 1986 [DE] Fed. Rep. of Germany ....... 3608801

[51] Int. Cl.4 .............................................. B01D 46/00
[52] U.S. Cl. ....................... 55/283; 55/466; 55/523; 55/DIG. 30; 60/286; 60/311
[58] Field of Search ................... 55/269, 96, 466, 523, 55/283; 60/311, 286

[56] References Cited

U.S. PATENT DOCUMENTS

| 4,404,795 | 9/1983 | Oishi et al. | 60/274 |
| 4,450,682 | 5/1984 | Sato et al. | 55/283 |
| 4,512,786 | 4/1985 | Sakurai et al. | 55/282 |
| 4,571,938 | 2/1986 | Sakurai | 55/466 |
| 4,651,524 | 3/1987 | Brighton | 55/DIG. 30 |

Primary Examiner—Bernard Nozick
Attorney, Agent, or Firm—Watson, Cole, Grindle & Watson

[57] ABSTRACT

A system for the regeneration, by oxidation, of the particulates deposited in a particulate filter trap of an internal cumbustion engine provided for purifying the engine exhaust gas, in which the thickness of the particulates deposited in a given area in the trap is determined relative to a predetermined thickness in excess of which the filter trap will operate inefficiently, and the excess thickness being reduced by regeneration.

3 Claims, 4 Drawing Sheets

SYSTEM FOR THE REGENERATION OF A PARTICULATE FILTER TRAP

The present application is a continuation-in-part of prior application Ser. No. 025,738, filed Mar. 13, 1987, which has been abandoned.

BACKGROUND OF THE INVENTION

This invention relates to a system for the regeneration, by oxidation, of the particulates deposited in a particulate filter trap of an internal combustion engine provided for purifying the engine exhaust gas.

Particulate filter traps are utilized for purifying engine exhaust gas in order to reduce particulate emissions from internal combustion engines, such as diesel engines having direct or indirect injection. Such filter traps, of honeycomb-like, monolithic and ceramic material, have a high filtering effect for the soot in the exhaust gas from diesel engines. The honeycomb filter traps have a plurality of inlet channels along which the exhaust gas to be purified flows, the greatest amount of soot and other particulates being deposited on the internal ceramic walls of the channels, and the purified gas thereafter flowing outwardly through outlet channels. The channels are parallel to one another with the inlet channels being closed at the outlet face of the filter, and the outlet channels being closed at the inlet face of the filter. As the soot is deposited on the surfaces of the inlet channels, the flow resistance through the filter increases which leads to an increase in the exhaust gas counterpressure. Such an increase in exhaust gas counterpressure, however, effects an increase in fuel consumption and can, in the event of a blockage in the filter, cause engine stall. It therefore becomes necessary to continuously or intermittently burn away the soot and other particulates collected in the filter. Temperatures of 550° to 650° C. are required for thermal soot oxidation. By heating up the entire exhaust gas flow these temperatures can be thereby obtained. However, with a low amount of heat removal, it is possible to employ an initial ignition to burn the soot at the beginning of the filter inlet channels such that during the course of the soot being exothermally burned off, a further and self-sustained combustion of the soot layer can be effected.

Besides obtaining the increased temperature acquired for thermal soot oxidation, a self-sustaining regeneration of the particulate filter trap for completing the soot burn-off in the inlet channels depends especially on the amount of soot deposited in the inlet channels. A sufficiently thick layer of soot must be present in the inlet channels so that, because of heat released by engine combustion (minus the heat that has been removed by the exhaust gas and the filter material), a positive heat balance for the propagation of the soot burning may be effected. However, the thickness of the deposited soot layer must not be too great since the heat development otherwise increases to such an extent during soot combustion which results in destruction of the filter due to "heat bonding" or "melting on" of the filter material and/or due to thermal cracking resulting from impermissibly high temperature gradients over the filter material.

In the regeneration process according to U.S. Pat. No. 4,436,535, the pressure in front of the filter is measured. Pressure measured in such manner, however, is dependent on the velocity of flow of the exhaust gas in the filter channels. The flow velocity is dependent on the exhaust gas temperature and the exhaust gas volume flow, and hence upon load (torque) and the rpms of the engine. Furthermore, the counterpressure is influenced by the uneven deposit of the soot as well as the soot composition and thereby the density of the soot layer.

Sensors may also be employed for measuring the particulate concentration in the exhaust gas stream which is to be purified so as to use it as a control size. The disadvantage in such an approach, however, is that the particulate accumulatation precipitated on the sensors is dependent on particle size and the composition of the particulates. The control of the regeneration operation should rather take place independently of the flow velocity, the particulate size and the composition of the particulates.

U.S. Pat. No. 4,283,207 discloses an approach in which a periodic ignition of the particulates is to take place by applying a relatively strong electric current and voltage through the soot layer for combustion thereof. The soot ignition and burn-off step is therefore dependent not only on the amount of electrical energy conducted into the soot layer, but rather most importantly on the removal of heat by the exhaust gas which is to be purified by the filter trap material being employed. Here, heat removal by means of the exhaust gas is a function of load (torque) and the engine rpms. This leads to the disadvantage that the burning of soot is introduced with greatly varying amounts of soot present as a consequence of the dependence on the operation of the engine which, in this case, is undesireable. Another disadvantage is that due to the permanent contact made with the voltage, which is not restricted to given periods, an ineffective and high consumption of electrical energy takes place.

U.S. Pat. No. 4,549,398 discloses an exhaust gas cleaning device for diesel engines as including a heater, a detection signal line at the inflow side of the filter for detecting exhaust gas pressure, a detection signal line for detecting the temperature inside the filter, and a detection signal line at the outflow side of the filter for the temperature of the exhaust gas. However, the heat capacity for the soot layer cannot be detected with such arrangement, since a second in tandem or sequentially arranged heat sensing element is absent. Instead, this prior art device utilizes the temperature measuring positions to determine favorable marginal values for starting the filter regeneration. For this purpose the amount of soot in the filter is also detected. However, detection is carried out, not by measuring the heat capacity as in the invention, but rather by measuring the flow resistance of the soot layer by means of a pressure measurement at the inflow and outflow sides of the filter.

SUMMARY OF THE INVENTION

It is therefore an object of the present invention to avoid the aforementioned problems and disadvantages encountered in utilizing the prior filter regeneration techniques, by providing a filter regeneration approach which avoids an increased consumption of fuel and/or soot combustion energy, and at the same time avoiding filter damage from overheating as can occur from improper control of the regeneration operation. Also avoided by the invention is engine stoppage from improper control of the regeneration action.

In the regeneration system of the invention, the thickness of the particulates deposited in a given area of the trap is determined relative to a predetermined thickness in excess of which the filter trap will operate inefficiently, and the filter trap is regenerated by oxidation for reducing the thickness of any particulates deposited in excess of the predetermined thickness.

Regeneration can be carried out automatically and/or by the input of the secondary energy, such as, for example, electrical energy. Also, regeneration can be carried out by introducing chemicals which aid in ignition of the soot layer.

Thus, according to the invention, the thickness of the soot layer deposited in the inlet channels of the filter trap is determined, so that filter regeneration can be effected depending on the soot layer thickness. This thickness is determined by the provision of a pair of spaced apart electrically conductive electrodes located at a given area of the filter trap. By applying electrical voltage, the electrical resistance of the soot layer between the two electrodes can be determined as a standard for the particulate mass in the filter. The electrodes may be in the form of a pair of spaced metallic layers which may comprise porous metallic layers. Between these layers, the resistance of the soot being deposited can be employed as a standard for the thickness layer. An advantage in utilizing this type of direct regeneration control and introduction or regeneration is that an increase in soot build-up, for example, due to defective/malfunctioning injection systems, can be recognized. This increase can signal the engine operator, and such signal can be applied to adjust an increased regeneration frequency. The direct measurement of soot layer thickness is in direct relation to the level of soot accumulating in the entire filter trap, and is not dependent on the flow status of the exhaust gas as would be the case when determining the counterpressure of the exhaust gas.

Another advantage of the system according to the invention is that the measurement of the soot layer thickness in a given area of the filter trap can be carried out and employed in controlling the regeneration of such given area or areas. For a predetermined soot layer thickness, as a layer thickness limit which is exceeded, a signal can be applied to an electrical control unit, which, for example, switches on resistance heating elements located in the input channels of the filter trap. The heating elements ignite the soot deposits and, when there is little heat removal, advances the burning of the soot in the input channels on its own. After soot burn-off has travelled along a given distance in the inlet channel less than the entire length of such channel, the electrodes signal that a corresponding portion of the soot layer has been burned off. The resistance heating elements are then switched off and the burning of the soot in the input channels continues on its own.

A burner may likewise be employed, in lieu of electrical resistance heating elements, for igniting the soot layer intermittently.

In accordance with the present invention, means are provided for measuring the thermal resistance (heat capacity) of the layer of particulates deposited in the trap so as to detect the mass of the particulates deposited in the trap. This unique approach is incapable of being carried out by the aforementioned 4,549,398 device in which measuring is accomplished by means of engine exhaust gas counterpressure.

DETAILED DESCRIPTION OF THE INVENTION

Figure 1:
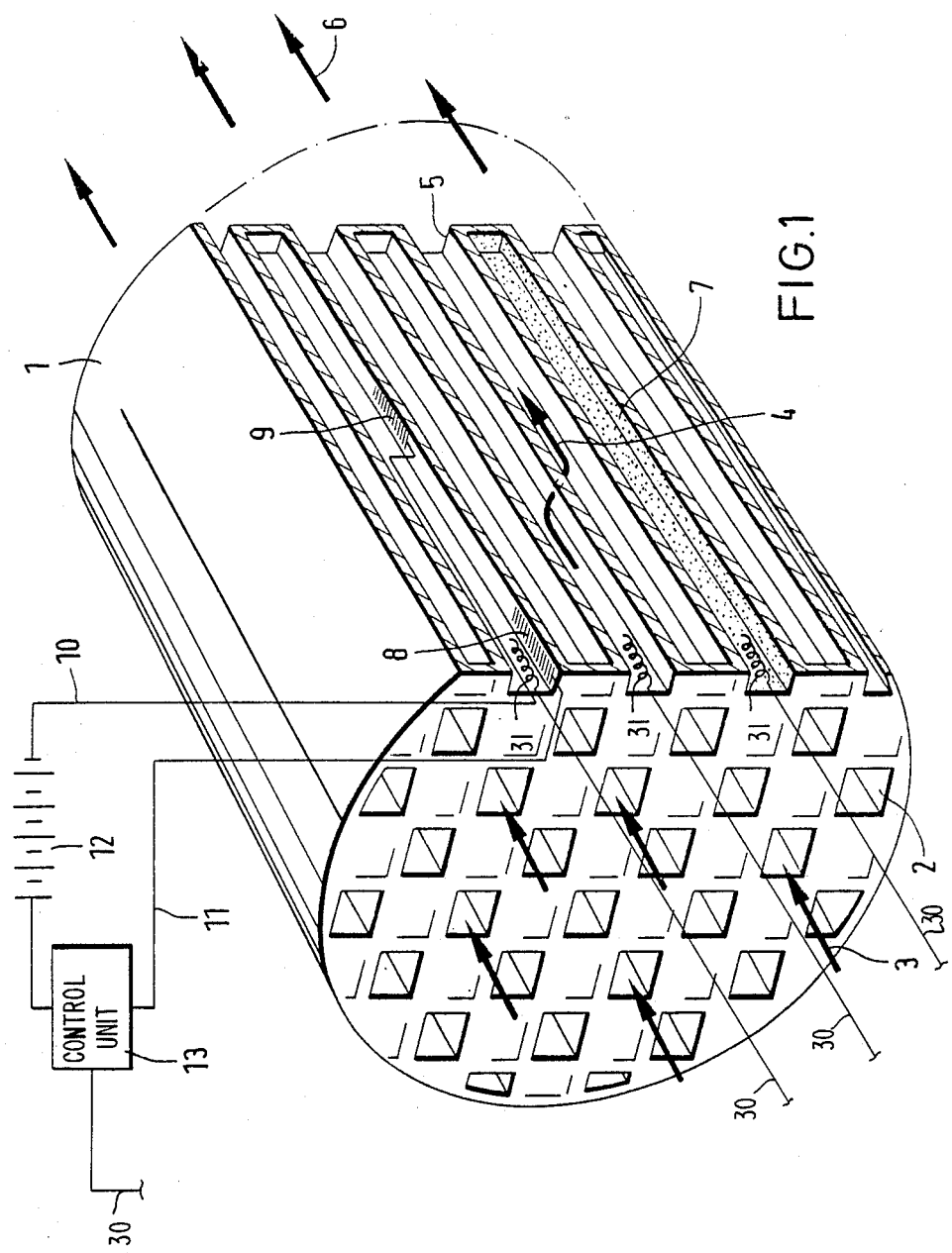
FIG. 1 is a schematic, partly sectioned view of a honeycomb particulate filter trap according to a first embodiment of the present invention having a metallic conductive layer.

Turning now to the drawings wherein like reference characters refer to like and corresponding parts throughout the several views, a particulate filter trap 1 of known construction is illustrated in each of the Figures which is typically coupled to the exhaust pipe (not shown) of an internal combustion engine so that exhaust gas to be purified flows into inlet channels 2 in the direction of arrows 3, and flows in the direction of arrow 4 through outlet channels 5, while depositing the greatest amount of soot and other particulates on the ceramic walls of the inlet channels to be collected there as soot layers 7. The filter may be of ceramic material with a honeycomb structure, as shown. The purified gas exits the outlet channels in the direction of arrows 6.

In FIG. 1, electrodes 8 and 9 of electrically conductive material are applied in the form of metallic layers on a wall of one or more inlet channels at a predetermined spaced apart distance. Electric supply lines 10 and 11 are respectively connected to layers 8 and 9 and with a voltage source 12 to which a control and measuring unit 13 is connected. The electrical current and/or the electrical resistance of the soot layer is measured by unit 13 dependent upon the soot layer thickness deposited between electrodes 8 and 9. By provision of a limit value switch (not shown) for the flowing current in unit 13, regeneration can be initiated when the soot layer thickness exceeds a predetermined thickness. Thus, electrical energy can be switched on by unit 13, via line 30 for heating electrical resistance heating wires 31 located in the input channels. The resistance heating wires 31 may extend throughout the entire length of the input channels, or may be localized within the input channels.

After the soot is ignited at the beginning of the input channels by the resistance heating wires or the like, the front line of the flame progresses downstream in the direction of the closed end of the inlet channels. After the oxidation front has run its course in the soot layer at electrode 8, the flow of electric current can be interrupted between electrodes 8 and 9, and control unit 13 switches off the secondary energy used for supplying the resistance heating wires.

Figure 2:
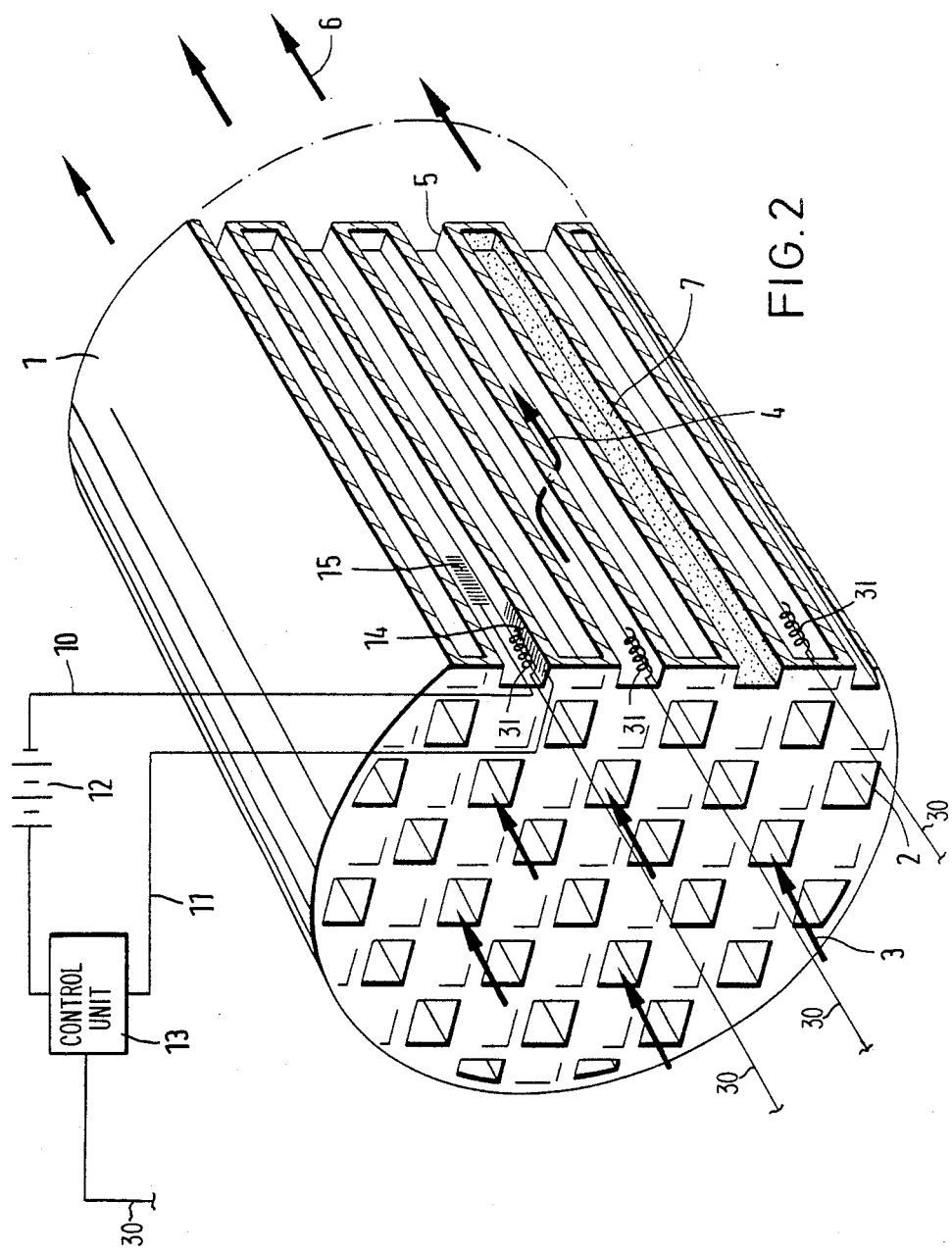
FIG. 2 is a schematic, partly sectioned view of a second embodiment having a porous metallic layer.

The FIG. 2 embodiment is essentially the same as that of FIG. 1 except that electrodes 14 and 15 comprise porous metallic layers which may be sprayed onto different surfaces in the inlet channel or channels. By spraying the electrically conductive surfaces onto the porous wall, an inner bonding of the conductive layer between the wall and the soot can be obtained. By locating the electrodes on different walls of the inlet channel, a lateral and/or longitudinal separation of the electrodes can be effected for avoiding a short circuit.

Figure 3:
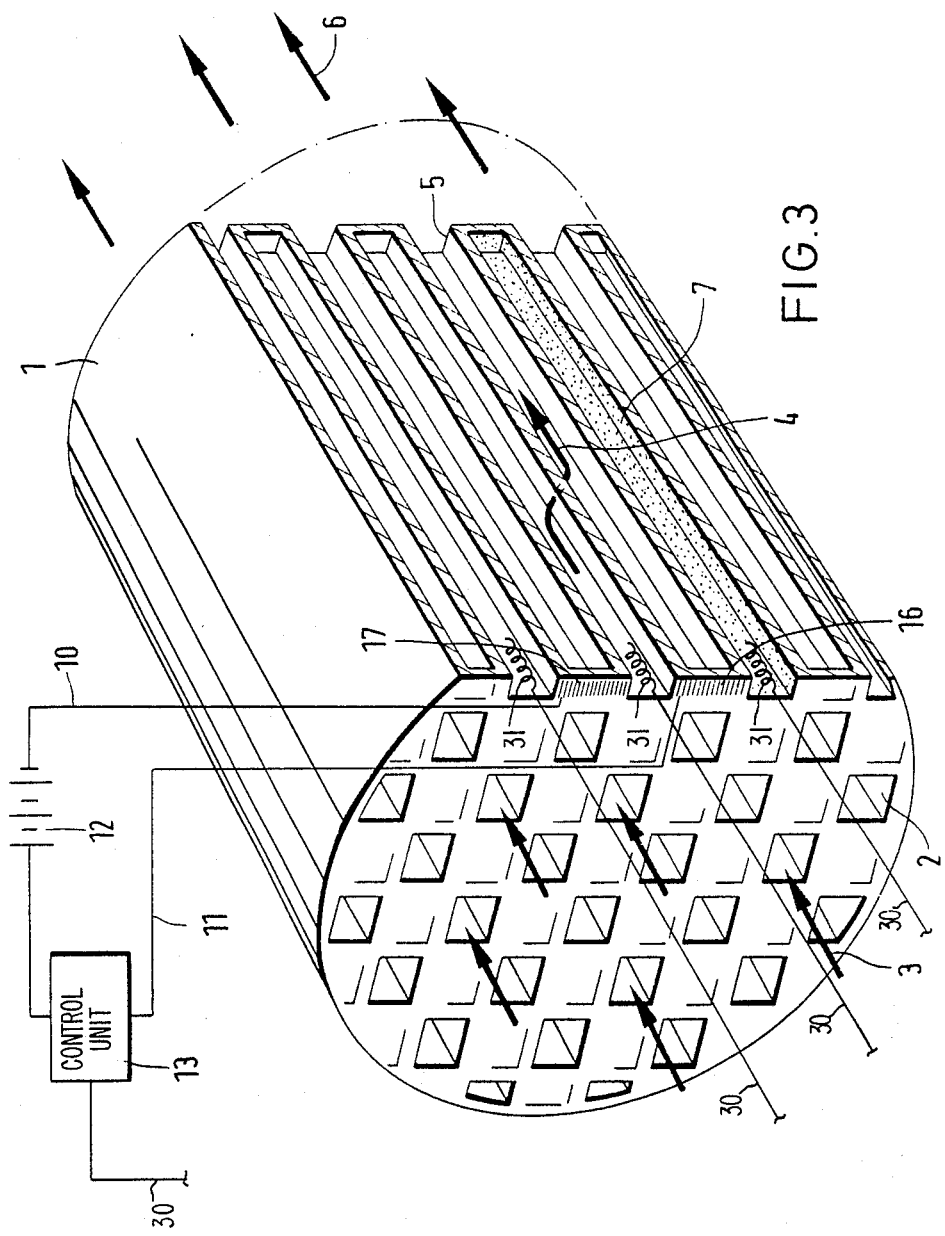
FIG. 3 is a schematic, partly sectioned view of a third embodiment having electrodes located on the front area at the input side of the filter trap.

In the FIG. 3 embodiment, electrodes 16 and 17 are located on the front area at the input side of the filter trap. As in the other embodiments, the electrodes are connected by electric supply lines 10 and 11 with voltage source 12 and control unit 13. Electrodes 16 and 17 may be easily coated on the front area of the filter without difficulty as compared to locating the electrodes within the inlet channel (FIGS. 1 and 2) which could prove more costly in terms of finishing. The thickness of the soot layer deposited on the front side of input channels 2 is measured, such that regeneration can be reliably controlled.

Figure 4:
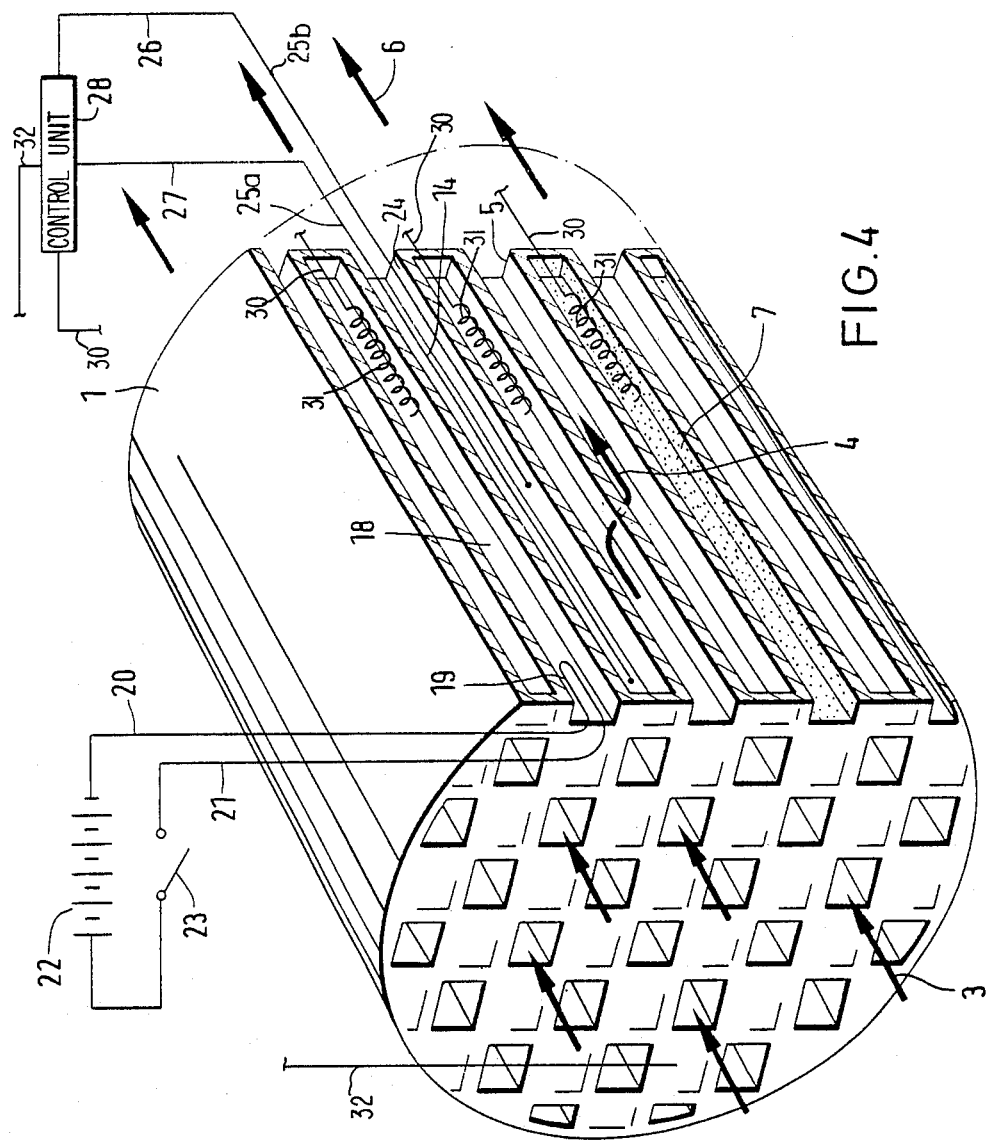
FIG. 4 is a schematic, partly sectioned view of a fourth embodiment in which the soot layer thickness or mass is measured by determining the exhaust gas temperature.

In the FIG. 4 embodiment the soot layer thickness or mass is measured by determining the exhaust gas temperature. An electrically heated resistance element 19 is located in one of the input channels 18 of filter trap 1. This element is supplied by voltage from source 22 via supply leads 21, 20. On and off switching can be carried out intermittently or continuously by a switch 23. In an outlet channel 24 adjacent inlet channel 18 there is located a pair of heat sensing elements 25a, 25b, arranged one behind the other, or in tandem, element 25a terminating directly below heat resistance element 19, as shown. The sensing elements are connected via supply lines 26, 27 with an evaluation and control unit 28. Depending on the exhaust gas temperature and its volume flow, resistance heating element 19 is arranged to heat up the exhaust gas in inlet channel 18 to a predetermined level. The exhaust gas temperature which flows transversely at the level of the heating element 19 to the adjoining outlet channel 24 and thus to sensing element 25a, is detected by this heat sensing element. With increasing soot layer thickness at the entry side of inlet channel 18, an increasing amount of the heat of element 19 is absorbed by the surrounding soot layer so that the temperature of the exhaust gas flow which transversely is directed toward sensing element 25a is less than a transversely flowing exhaust gas temperature without the surrounding soot layer. In other words, the exhaust gas passing through channel 18 at the area of element 19 is heated inversely to an increase in thickness of the particulates deposited thereat. Moreover, the temperature of the exhaust gas flow through channel 18 is diminished in relation to a similar thickness, so that heat sensing element 25b located in outlet channel 24 at an axial distance from element 19 will register little if any change in temperature. The reduced temperature gradient occasioned by soot layer thickness is compared and evaluated by control unit 28 with the temperature of the exhaust gas before entering the filter trap, by the provision of a suitable heat sensor 32 located adjacent the entry side of the trap as shown. Soot layer thickness can therefore be determined based o the temperature differentials in the partial heating of inlet channel 18. Any excess of the measured thickness above a predetermined thickness set within control unit 28 as it relates to the sensed temperature of the exhaust gas which flows through such predetermined thickness, is burned off by heating elements 31 as controlled by unit 28 via supply lines 30. In other words, sensor 25a senses the temperature of the transverse flow from channel 18 at a given predetermined value depending on a predetermined soot layer thickness in excess of which the filter trap will operate inefficiently. As the soot layer thickness increases, the thicker layer absorbs more heat from element 19 such that the temperature of the transverse flow of exhaust gas from channel 18 to channel 24 decreases. This decreased temperature is sensed by sensor 25a, and is compared and evaluated by unit 28 relative to the exhaust gas temperature before entering the filter trap. An excess soot layer thickness is therefore determined.

In lieu of resistance heating elements 31, the invention may likewise be carried out by the provision of catalytic fuel additives and a burner to which the fuel with oxygen is supplied in an appropriate manner.

Also, the secondary heat energy supplied for burning off the excess soot layer thickness, and controlled depending on the amount of particulates deposited in prescribed areas of the filter trap, can be interrupted prior to complete regeneration and/or controlled over time, depending on the measured amount of the particulates deposited.

It can be also useful that the amount of particulates deposited in the given area of the filter trap is carried out by measuring the attenuation of specific frequencies when acceleration is stimulated.

In accordance with the thermal resistance measuring principle of the invention, the amount of particulates is detected by means of the changes in heat capacity of the filter material due to the deposit of particulates in the trap through an energy balance at dynamic temperature changes. For this purpose a heat source is located at the exhaust gas inflow side of the trap but not, however, for the purpose of igniting the collected particulates. The heat capacity changes depending on the amount of particulates in the filter. And, dependent on the heat capacity is the heat amount which is stored in the trap with a change of temperature at the gas inflow side, e.g., when switching-on a defined heat source. The heat capacity affects a delayed temperature increase at heat sensing elements 25a and 25b. The heat capacity switched between the heat source and sensing element 25a differs from the heat capacity between sensing element 25b and the heat source by a constant factor (the filter wall) and a factor linearly dependant on the soot mass. This difference in heat capacity leads to differing heat rates of sensing elements 25a and 25b after switching-on the heat source. As compared to element 25a, element 25b responds in a delayed manner as related to the increase in heat capacity, i.e., the mass of the deposited particulates in the trap. Thus, the heat capacity of the soot is utilized as a physical value for determining the mass of the particulates deposited in the trap. For equalization of the various exhaust gas temperatures it is necessary to measure them at the inflow side of the filter.

Several advantages arise by measuring the thermal resistance according to the invention as compared to the measuring of flow resistance for determining the soot amount in the filter, as in the aforementioned U.S. Pat. No. 4,549,398. For example, the pressure drop above the filter is dependent, apart from the amount of soot in the filter, on the flow speed, the exhaust gas pulsation and the exhaust gas viscosity. In order to determine the amount of soot in the filter from this pressure measurement according to Oishi, the exhaust gas volume flow must be measured. This can be carried out approximately by measuring the engine rpm and the exhaust gas temperature. Such data must be then joined in a computer. There are therefore a great number of error possibilities which can lead to incorrect measurements and thus to a malfunction of the regeneration system.

Contrary to such prior art approach, the heat capacity of the soot layer is the parameter which is essentially independant of the operation of the filter. For measuring, only two sequentially switched heat sensors and a defined heat source are required. The influence of the mass of the exhaust gas stream on the temperature in the filter is eliminated by measuring the temperature difference.

By contrast, it is not possible to detect the mass of the particulates deposited in the trap according to the teachings of the U.S. Pat. No. 4,549,398. In order to measure the heat capacity of the soot layer, a heat source and two temperature measuring locations in the filter, arranged one behind the other, or in tandem, is necessary, as in the invention.

Obviously, many other modifications and variations of the present invention are made possible in the light of the above teachings. It is therefore to be understood that within the scope of the appended claims the invention may be practiced otherwise than as specifically described.

What is claimed is:

1. A system for the regeneration of a particulate filter trap provided for the exhaust gases of an internal combustion engine, the trap having an exhaust gas inflow side and a purified exhaust gas outflow side and a plurality of adjacent inlet and outlet channels extending between said sides and secondary energy means supplied to the trap for initiating the regeneration in dependence on the thermal resistance of the amount of particulates deposited in the trap, means at the inflow side extending into one of said inlet channels for controlled production of thermal energy at a predetermined first location therein, a sensor upstream of said inflow side for sensing the exhaust gas temperature, and temperature measuring means at the outflow side extending into one of the outlet channels to a predetermined second location separated from the first location by a layer of the deposited particulates, control means connected to said sensor for comparing and evaluating a reduced temperature gradient in the trap occasioned by the amount of the deposited particulates with the temperature of the exhaust gas before entering the trap, and said control means being connected to said measuring means for determining the temperature gradient and for controlling an increase in the supply of the secondary energy in dependence on said temperature gradient.

2. The system according to claim 1, wherein said means for controlled production of thermal energy comprises an electrical resistance heater element.

3. The system according to claim 1, wherein said temperature measuring means comprise heat sensing elements.

* * * * *